US012431031B1

(12) United States Patent
Pan et al.

(10) Patent No.: US 12,431,031 B1
(45) Date of Patent: Sep. 30, 2025

(54) METHOD AND DEVICE FOR PREDICTING CALL LOAD OF CONTROLLER

(71) Applicant: Civil Aviation Flight University of China, Guanghan (CN)

(72) Inventors: Weijun Pan, Guanghan (CN); Boyuan Han, Guanghan (CN); Yidi Wang, Guanghan (CN); Qinghai Zuo, Guanghan (CN); Xuan Wang, Guanghan (CN); Tian Luan, Guanghan (CN); Rundong Wang, Guanghan (CN)

(73) Assignee: Civil Aviation Flight University of China, Guanghan (CN)

( * ) Notice: Subject to any disclaimer, the term of this patent is extended or adjusted under 35 U.S.C. 154(b) by 0 days.

(21) Appl. No.: 19/017,844

(22) Filed: Jan. 13, 2025

(30) Foreign Application Priority Data

Apr. 1, 2024 (CN) ......................... 202410384631.1

(51) Int. Cl.
*G08G 5/72* (2025.01)
*G08G 5/20* (2025.01)
*G08G 5/26* (2025.01)

(52) U.S. Cl.
CPC ............... *G08G 5/727* (2025.01); *G08G 5/20* (2025.01); *G08G 5/26* (2025.01); *G08G 5/72* (2025.01)

(58) Field of Classification Search
CPC G08G 5/727; G08G 5/72; G08G 5/70; G08G 5/20; G08G 5/22; G08G 5/00
See application file for complete search history.

(56) References Cited

U.S. PATENT DOCUMENTS 11,393,342 B1 * 7/2022 Moeykens ............... G08G 5/32

FOREIGN PATENT DOCUMENTS

CN 101923790 A * 12/2010
CN 103530704 A * 1/2014
CN 105205565 A * 12/2015
CN 110060513 A * 7/2019 ....... G06Q 10/06393
(Continued)

OTHER PUBLICATIONS

CN 105205565 A, "Controller Work Load Forecasting Method and System Based on Multiple Return Modes", Cheng et al., English Translation (Year: 2015).*
(Continued)

*Primary Examiner* — Jason Holloway
*Assistant Examiner* — Benjamin J Brosh
(74) *Attorney, Agent, or Firm* — Hemisphere Law, PLLC; Zhigang Ma

(57) ABSTRACT

According to a method for predicting a call load of a controller, a flight trajectory of an aircraft is calculated by analyzing route information of an area to be predicted, a command intention of the controller and a flight intention of a pilot, and then a more accurate flight trajectory of the aircraft is predicted through the calculated flight trajectory, so that a future call node and content are acquired. The predicted call content is combined with the current specific control scene to predict call time required by the call content. Finally, the call load is calculated by the required call content and time and the call node, finally the purpose of predicting the call load of the controller in a time period of the future is achieved, and more reliable support is provided for timing requirements in an air traffic control process.

2 Claims, 2 Drawing Sheets

(56) References Cited

FOREIGN PATENT DOCUMENTS

| | | | | |
|---|---|---|---|---|
| CN | 114530059 A | * | 5/2022 | |
| EP | 3143933 A1 | * | 3/2017 | ........... A61B 5/0476 |

OTHER PUBLICATIONS

CN 103530704 A, “A Terminal Air Traffic Dynamic Capacity Prediction System and Method Thereof”, Han et al., English Translation (Year: 2014).*

CN 114530059 A, “Dynamic Configuration Method and System of Multi-sector Monitoring Seat”, Hu et al., English Translation (Year: 2022).*

CN 110060513 A, “Aerial Traffic Controller Workload Assessment Method Based on Historical Trajectory Data”, Kang et al., English Translation (Year: 2019).*

EP 3143933 A1, “Method for Estimating a Mental State, in Particular a Workload, and Related Apparatus”, Arico et al., English Translation (Year: 2017).*

CN 101923790 A, “Air Traffic Control Section Dynamic Adjusting System and Method”, Cheng et al., English Translation (Year: 2010).*

China Civil Aviation Flight University (Applicant), Replacement claims (allowed) of CN202410384631.1, May 6, 2024.

CNIPA, Notification to grant patent right for invention in CN202410384631.1, May 10, 2024.

* cited by examiner

METHOD AND DEVICE FOR PREDICTING CALL LOAD OF CONTROLLER

CROSS-REFERENCE TO RELATED APPLICATION

This application claims priority to Chinese Patent Application No. CN202410384631.1, filed Apr. 1, 2024, which is herein incorporated by reference in its entirety.

TECHNICAL FIELD

The disclosure relates to the field of air traffic control, and more particularly to a method and device for predicting a call load of a controller.

BACKGROUND

In recent years, with the increasing air traffic and the vigorous development of aviation industry, an increasing air traffic volume poses a serious security challenge to the existing airspace management system, and more accurate methods are urgently needed to evaluate an airspace capacity. The workload of an air traffic controller is a key factor to determine the airspace capacity and safety. Therefore, it is very important to quantitatively evaluate and predict the workload of the air traffic controller scientifically. The airspace capacity refers to the maximum number of aircrafts that can be safely and effectively accommodated in a certain time and space range, and is directly related to operational efficiency and safety of an aviation system. In order to effectively evaluate the airspace capacity, researchers are committed to finding suitable methods, wherein a control load has become a core factor that has aroused widespread concern. At present, the research on control load evaluation at home and abroad mainly focuses on measuring physiological indicators of the controller. However, due to the existence of individual differences, it is difficult to fully and accurately reflect the workload of the controller only by relying on the physiological indicators. In order to solve this problem, the researchers actively explore the application of a task measurement method in the control load evaluation. The task measurement method is favored due to strong objectivity, simple operation and other advantages, and has become an effective way to evaluate the workload of the controller.

In the research of airspace capacity evaluation, the researchers mainly start with influencing factors, and think that control workload is one of the most important factors. Whether the controller can maintain a reasonable workload directly affects the safety and stability of airspace operation. Therefore, through in-depth study of the control workload, it not only helps to understand a formation mechanism of the airspace capacity more comprehensively, but also provides important theoretical support for improving operational efficiency of the aviation system. From the point of view of practical application, it is of great practical significance to evaluate the airspace capacity by using the control workload. By digging deeply into an influence mechanism of the control workload on the airspace capacity, it can provide a scientific basis for formulating reasonable control strategies, thereby optimizing the operational efficiency of the aviation system. In addition, the airspace capacity evaluation method based on the control workload can also provide decision support for aviation management departments to ensure the safe and orderly operation of air traffic.

The traditional method measures the workload mainly by considering the number of times of the controller providing services to the aircraft, but this method does not fully consider the influence of different airspace structure characteristics, traffic flow density and other factors on the workload of the controller. Therefore, it is difficult to accurately describe the control intensity in the current high-flow and high-density traffic environment. In actual air traffic control, the controller mainly tracks and controls airspace traffic dynamics by monitoring a radar screen and filling in a progress list, and issues the instructions of control measures to pilots by radio. When a ground-air call load is too heavy, it is difficult for the controller to make effective plans in time due to lack of enough time for context awareness, which possibly brings potential security risks.

Therefore, the ground-air call load largely reflects the overall workload level of the controller. An in-depth understanding of the relationship between various complex factors and the control ground-air call load will help to evaluate the load of control work more accurately. Although the current research has been continuously improved and expanded, it focuses on the selection of complexity parameters, the determination of complexity factor weights and the application of complexity in different airspace types. However, there is still a lack of in-depth and detailed analysis on the relationship between traffic complexity factors and the ground-air call load of the controller.

SUMMARY

An objective of the disclosure is to overcome the problem of lack of analysis of a ground-air call load of a controller in the related art, and provide a method and device for predicting a call load of the controller.

In order to achieve the above inventive objective, the disclosure provides the following technical solution.

A method for predicting a call load of a controller includes the following steps:

- S1: acquiring air traffic control data of an area to be predicted; and the air traffic control data includes real-time data, route data and historical data;
- S2: analyzing flight path prediction information of each aircraft in the area to be predicted according to the air traffic control data; and the flight path prediction information includes a flight path of each aircraft and time of arrival at each point in the flight path;
- S3: acquiring a command scheme corresponding to each aircraft in the area to be predicted according to the flight path prediction information of each aircraft and the historical data;
- S4: calculating call time of the controller on each aircraft according to the command scheme; and
- S5: calculating call interval time in each time period according to the call time, and outputting the call interval time as a call load prediction result of the controller in the area to be predicted.

In an embodiment, the real-time data includes ground-air call data, airspace restriction information, meteorological information and/or aircraft state information; the route data includes route information and/or flight procedure information; the historical data includes historical flight trajectory information, command schemes under different flight events and corresponding flight paths thereof; and the flight events include controller information, meteorological information, airspace restriction information, conflict type, time from a conflict, aircraft type and/or flow.

In an embodiment, the step S2 includes:

acquiring a command intention of the controller and a flight intention of a pilot corresponding to each aircraft through the ground-air call data;

acquiring the route information and/or the flight procedure information, and acquiring an initial flight path of each aircraft according to the command intention of the controller and the flight intention of the pilot corresponding to each aircraft;

according to the initial flight path of each aircraft and the route data, calculating initial time point information of each aircraft arriving at each point in a corresponding initial flight path;

according to the initial flight path and initial time point information of each aircraft in the area to be predicted, judging whether each aircraft has a conflict in a safe interval of the area to be predicted;

in response to an aircraft with the conflict, matching one of the command schemes corresponding to one of the flight events with the highest similarity in the historical data, updating the initial flight path and initial time point information of the aircraft with the conflict, and outputting the flight path prediction information of the aircraft with the conflict; and in response to an aircraft without the conflict, outputting the flight path prediction information of the aircraft without the conflict.

In an embodiment, a calculation formula of the initial time point information in the step S2 is:

time required for an aircraft to fly in a straight line:

$$T_l = \frac{D_f}{V_{GS} \cdot \mathrm{COS}(\alpha) - W}$$

where $T_1$ represents time required for straight flight, $D_f$ represents a flight distance, $V_{GS}$ represents a ground speed of the aircraft, $\alpha$ represents an included angle between the aircraft and ground, and W represents an external wind speed; and time required for the aircraft to turn:

$$T_t = \frac{\theta_t \cdot (R + D_p)}{V - W}$$

where $T_t$ represents time required for turning, $\theta_t$ represents a turning angle, R represents a turning radius, V represents a speed of the aircraft, W represents the external wind speed, and $D_p$ represents a distance of the aircraft deviated from a predetermined trajectory by wind.

In an embodiment, the step S3 includes:

S31: matching the historical flight trajectory information with the highest similarity to flight path information of each aircraft and the command scheme corresponding to each flight event in the historical data;

S32: updating the flight path information of each aircraft according to corresponding historical flight trajectory information to acquire accurate flight path information of each aircraft and one of the command schemes of a corresponding flight event; and S33: outputting the command scheme corresponding to each aircraft in the area to be predicted.

In an embodiment, the step S32 is performed through a pre-constructed flight path prediction model based on long short-term memory (LSTM) for optimizing and updating; and the pre-constructed flight path prediction model includes at least one encoder and at least one decoder;

an operation expression of the encoder is:

$$h_{enc,t}=\mathrm{LSTM}(X_{plan,t}, X_{atc,t}, X_{pilot,t}, X_{history,t}, h_{enc,t-1})$$

an operation expression of the decoder is:

$$h_{enc,t}=\mathrm{LSTM}(Y_{prev,t-1}, h_{dec,t-1})$$

$$Y_{prev,t}=\mathrm{Dense}(h_{enc,t}, h_{dec,t})$$

where $h_{enc,t}$ and $h_{dec,t}$ represent hidden states of the encoder and decoder at time step t respectively, and $X_{plan,t}$ represents a flight plan information sequence at the time step t, and $X_{plan,t}$ is acquired from the route data; $X_{atc,t}$ represents a controller command information sequence at the time step t, and $X_{atc,t}$ is acquired from the air traffic control data; $X_{pilot,t}$ represents a pilot input information sequence at the time step t, and $X_{pilot,t}$ is acquired from the air traffic control data; $X_{history,t}$ represents a historical data sequence at the time step t; $Y_{prev,t}$ represents a predicted flight path at the time step t; LSTM( ) represents LSTM unit processing, and Dense( ) represents full connection processing.

In an embodiment, the flight path prediction model adopts a mean square error as a loss function, and an expression thereof is:

$$\mathrm{Loss} = \frac{1}{N}\sum_{t=1}^{N} \|Y_{true,t} - Y_{prev,t}\|^2$$

the loss function also includes minimization through Adam optimizer, and an expression thereof is:

$$\text{Optimization: } \theta \leftarrow \theta - \eta \nabla_{74} \mathrm{Loss}$$

where $Y_{true,t}$ represents an actual flight path at the time step t, N represents a number of samples, $\nabla_\theta$ represents a gradient symbol, and represents derivative of $\theta$, $\theta$ represents a model parameter, and $\eta$ represents a learning rate.

In an embodiment, the step S4 includes:

S41: acquiring call content of each command scheme, and setting a call time initial value of each command scheme as general call time; and the general call time is average call time of each controller using each instruction in the historical data;

S42: matching with the historical data according to the corresponding real-time data and the call content to acquire the command scheme with the highest similarity and corresponding historical call time;

S43: according to the historical call time, revising the call time of each command scheme of the aircraft; and S44: calculating the call time of the controller on each aircraft.

In an embodiment, the call interval time in each time period is equal to a difference between unit time and total call time of the controller in each time period divided by call frequency.

A device for predicting the call load of the controller includes at least one processor and a memory communicatively connected with the at least one processor; the memory stores instructions executable by the at least one processor, and the instructions are executed by the at least one processor to enable the at least one processor to execute any method above.

Compared with the related art, the beneficial effects of the disclosure are as follows.

According to the method for predicting the call load of the controller, a flight trajectory of the aircraft is calculated by analyzing the route information of the area to be predicted, the command intention of the controller and the flight intention of the pilot, and then a more accurate flight trajectory of the aircraft is predicted through the calculated flight trajectory, so that a future call node and content are acquired. The predicted call content is combined with the current specific control scene to predict call time required by the call content. Finally, the call load is calculated by the required call content and time and the call node, finally the purpose of predicting the call load of the controller in a time period of the future is achieved, and more reliable support is provided for timing requirements in an air traffic control process.

DETAILED DESCRIPTION OF EMBODIMENTS

The following provides a further detailed description of the disclosure in conjunction with specific examples and embodiments. However, it should not be understood that the scope of the above subject matter of the disclosure is limited to the following embodiments, and any technology realized based on the content of the disclosure falls within the scope of the disclosure.

Embodiment 1

Figure 1:
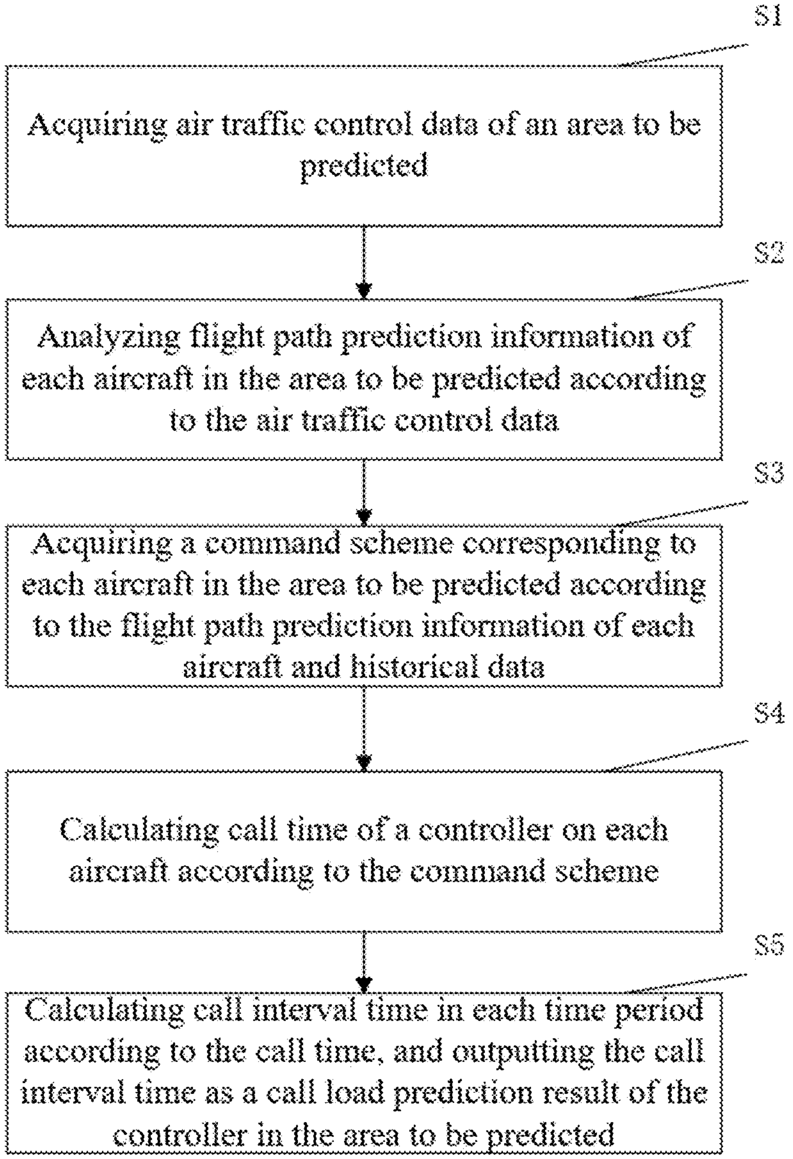
FIG. 1 illustrates a flowchart of a method for predicting a call load of a controller according to embodiment 1 of the disclosure.

As shown in FIG. 1, a call load prediction method for a controller includes the following steps.

S1: air traffic control data of an area to be predicted are acquired; and the air traffic control data includes real-time data, route data and historical data.

S2: flight path prediction information of each aircraft in the area to be predicted are analyzed according to the air traffic control data; and the flight path prediction information includes a flight path of each aircraft and time of arrival at each point in the flight path.

S3: a command scheme corresponding to each aircraft in the area to be predicted is acquired according to the flight path prediction information of each aircraft and the historical data.

S4: call time of the controller on each aircraft is calculated according to the command scheme.

S5: call interval time in each time period is calculated according to the call time, and the call interval time is outputted as a call load prediction result of the controller in the area to be predicted.

Embodiment 2

This embodiment is a concrete implementation of the method for predicting the call load of the controller according to embodiment 1, which includes the following steps.

S1: the air traffic control data of the area to be predicted is acquired.

The air traffic control data includes real-time data, route data and historical data.

Specifically, the real-time data includes ground-air call data, airspace restriction information, meteorological information and/or aircraft state information.

Specifically, the route data includes route information and/or flight procedure information.

Specifically, the historical data includes historical flight trajectory information, command schemes under different flight events and corresponding flight paths thereof; and the flight events include controller information, meteorological information, airspace restriction information, conflict type, time from the conflict, aircraft type and/or flow.

S2: the flight path prediction information of each aircraft in the area to be predicted is analyzed according to the air traffic control data; and the flight path prediction information includes the flight path of the corresponding aircraft and the time of arrival at each point in the flight path.

Firstly, voice signals are acquired according to the ground-air call data, then the voice signals are converted into text, and then a command intention of the controller and a flight intention of a pilot are understood by a natural language processing technology; an initial flight path is calculated in combination with fixed information such as flight procedures and air routes (that is, an original trajectory is generated by the fixed information such as the flight procedures and air routes, and then adjusted according to the command intention of the controller and the flight intention of the pilot to acquire the initial flight path), then the information such as the path and a speed gradient of the aircraft are comprehensively calculated to acquire the time of arrival at each point of each flight path, the path and time information of all aircrafts are integrated, and a conflict is judged according to a safe interval in the area. Finally, a new path prediction solution is acquired in combination with an adjustment mode of the conflict in the historical data and output to the next step.

The ground-air call data in the real-time data are converted into text information.

According to the text information, the command intention of the controller and the flight intention of the pilot corresponding to each aircraft are acquired.

The route information and/or flight procedure information is acquired, and the initial flight path of each aircraft is acquired according to the command intention of the controller and the flight intention of the pilot corresponding to each aircraft.

According to the initial flight path of each aircraft and the route data, initial time point information of each aircraft arriving at each point in the corresponding initial flight path is calculated.

That is, the time for the aircraft to arrive at each point is directly calculated according to the information such as position, altitude, speed, slope, descending rate and ascending rate of the aircraft. Specifically, a calculation formula of the initial time point information is as follows.

Time required for an aircraft to fly in a straight line:

$$T_l = \frac{D_f}{V_{GS} \cdot \mathrm{COS}(\alpha) - W}$$

where $T_l$ represents time required for straight flight, $D_f$ represents a flight distance, $V_{GS}$ represents a ground speed of the aircraft, a represents an included angle between the aircraft and ground, and W represents an external wind speed.

Time required for the aircraft to turn:

$$T_t = \frac{\theta_t \cdot (R + D_p)}{V - W}$$

where $T_t$ represents time required for turning, $\theta_t$ represents a turning angle, R represents a turning radius, V represents a speed of the aircraft, W represents the external wind speed, and $D_p$ represents a distance of the aircraft deviated from a predetermined trajectory by wind.

According to initial flight paths and initial time point information of all aircrafts in the area to be predicted, whether each aircraft has a conflict in the safe interval of the area to be predicted is judged.

In response to an aircraft with the conflict, the command scheme corresponding to a flight event with the highest similarity in the historical data is matched, the initial flight path and initial time point information of the aircraft are updated, and the flight path prediction information of the aircraft with the conflict is output.

In response to an aircraft without the conflict, the flight path prediction information of the aircraft without the conflict is output.

The flight path prediction information of the aircraft in the area to be predicted is output.

In this step, auxiliary correction is performed through the command intention of the controller and the flight intention of the pilot in combination with the historical data, and an accurate flight path in the future is predicted. An accurate flight path is different from a general flight path in that the general flight path only includes the height and time of arriving at each point, and the accurate flight path needs to acquire the turning or height adjustment point of the aircraft in this flight segment. This involves flight dynamic analysis to predict the flight trajectory of the aircraft more accurately, and at the same time, path planning is optimized by using the historical data.

S3: the command scheme corresponding to each aircraft in the area to be predicted is acquired according to the flight path prediction information of each aircraft and the historical data.

That is, through the acquired flight path prediction information, in combination with the flight trajectory information of similar situations in the historical data, the accurate flight path of the aircraft is predicted through deep learning, and then the most commonly used command scheme is selected according to different controllers and flight dynamics, thereby predicting the specific time and call content of the ground-air call between the controller and the pilot.

S31: the historical flight trajectory information with the highest similarity to the flight path information of each aircraft and the command scheme corresponding to each flight event are matched in the historical data.

That is, the historical flight trajectory information with the highest degree of overlap with the flight path to be matched, as well as each flight event corresponding to the flight trajectory information and the command scheme thereof in the historical data are acquired.

S32: the flight path information of each aircraft is updated according to the corresponding historical flight trajectory information to acquire accurate flight path information of each aircraft and the command scheme of a corresponding flight event.

In this section, by the previously acquired flight path and call time point, in combination with historical call data, the call content is predicted and the call time is corrected. For example, when the traffic is small, the controller directs the aircraft to enter the site directly according to standard instruments and reports at a designated position. At this time, the call will not be performed at the flight turning point of the middle position of a reporting point and an initial point, that is, the call node time needs to be corrected as the time of arriving at the initial point and a final point. In this section, the most commonly used command scheme of different controllers is selected as a prediction result by comparing a historical database.

S33: the command scheme corresponding to each aircraft in the area to be predicted is output.

Specifically, optimizing and updating in the step S32 are performed through a pre-constructed flight path prediction model based on LSTM; and the flight path prediction model includes at least one encoder and at least one decoder.

An operation expression of the encoder is:

$$h_{enc,t}=\text{LSTM}(X_{plan,t}, X_{atc,t}, X_{pilot,t}, X_{history,t}, h_{enc,t-1})$$

An operation expression of the decoder is:

$$h_{enc,t}=\text{LSTM}(Y_{prev,t-1}, h_{dec,t-1})$$

$$Y_{prev,t}=\text{Dense}(h_{enc,t}, h_{dec,t})$$

where $h_{enc,t}$ and $h_{dec,t}$ represent hidden states of the encoder and decoder at time step t respectively, and $X_{plan,t}$ represents a flight plan information sequence at the time step t, and $X_{plan,t}$ is acquired from the route data; $X_{atc,t}$ represents a controller command information sequence at the time step t, and $X_{atc,t}$ is acquired from the air traffic control data; $X_{pilot,t}$ represents a pilot input information sequence at the time step t, and $X_{pilot,t}$ is acquired from the air traffic control data; $X_{history,t}$ represents a historical data sequence at the time step t; $Y_{prev,t}$ represents a predicted flight path at time step t; LSTM( ) represents LSTM unit processing, and Dense( ) represents full connection processing.

The flight path prediction model adopts a mean square error as a loss function, and an expression thereof is:

$$\text{Loss} = \frac{1}{N}\sum_{t=1}^{N} \| Y_{true,t} - Y_{prev,t} \|^2$$

The loss function also includes minimization through Adam optimizer, and an expression thereof is:

$$\text{Optimization: } \theta \leftarrow \theta - \eta \nabla_\theta \text{Loss}$$

where $Y_{true,t}$ represents an actual flight path at the time step t, N represents a number of samples, $\nabla_\theta$ represents a gradient symbol, and represents derivative of θ, θ represents a model parameter, and f represents a learning rate.

In this step, firstly, the required call time of different types of standard instructions is acquired according to standard call. When calculating the required call time of each instruction, the actual call time of the same type of instructions in different situations in the historical data is analyzed, and the habit of issuing the instructions by different controllers is considered, thereby correcting the call time of the standard instructions and acquire the required call time of each instruction in this control scenario.

This method makes use of actual communication experience data, improves accurate estimation of the call time, and provides more reliable support for the timing requirements in an air traffic control process.

S4: the call time of the controller on each aircraft is calculated according to the command scheme.

In this section, mainly in combination with the current control scenario, the call content and the like, the acquired call content is matched with the historical database, general call time of this instruction is corrected by using deep learning, and finally the time required for each call is acquired.

S41: the call content of each command scheme is acquired, and a call time initial value of each command scheme is set as the general call time; the general call time is average call time of each controller using each instruction in the historical data, or described as the average call time of different controllers using various instructions under different control scenarios.

S42: the historical data is matched according to the corresponding real-time data and the call content to acquire the command scheme with the highest similarity and the corresponding historical call time.

S43: the call time of each command scheme of the aircraft is revised according to the historical call time. This step may perform revising through the existing neural network model.

Specifically, the existing neural network model adopts a time series model such as LSTM and recurrent neural network (RNN). For example, the LSTM model is adopted mainly due to the stronger modeling ability thereof for sequence data, especially suitable for processing long sequences and long-term dependencies. In the command scheme of the controller, the flight state of the aircraft and the instructions of the controller are often sequential. Therefore, the LSTM can effectively capture the time correlation and long-term dependence in these sequences.

The present embodiment takes the long short-term memory (LSTM) network as an example to explain how to correct the call time through the existing neural network model. Specifically, the mean square error (MSE) is selected as the loss function, and the Adam optimizer is used to optimize the parameters. Assuming that the input sequence is $X_f=\{x_1, x_2, \ldots, x_n\}$, where each of $x_1, x_2, \ldots, x_n$ is a feature vector containing information such as an aircraft state, controller instructions and traffic conditions The calculation process of the hidden state and memory state of the LSTM is as follows:

$$i_t=\sigma(W_{x1}x_t+W_{hi}h_{t-1}+W_{ci}c_{t-1}+b_i)$$

$$f_t=\sigma(W_{xf}x_t+W_{hf}h_{t-1}+W_{cf}c_{t-1}+b_f)$$

$$c_t=f_t\odot c_{t-1}+i_t\odot \tanh(W_{xc}x_t+W_{hc}h_{t-1}+b_c)$$

$$o_t=\sigma(W_{xo}x_t+W_{ho}h_{t-1}+W_{co}c_{t-1}+b_o)$$

$$h_t=o_t\odot \tanh(c_t)$$

where $i_t$, $f_t$, $o_t$ represent outputs of an input gate, a forgetting gate and an output gate, $\sigma$ is a sigmoid function, $\odot$ represents multiplication at an element level, W represents a weight matrix, b represents a paranoid vector, $h_t$ represents the hidden state of the LSTM, and represents the internal representation of the model for the input at a time step t, $c_t$ represents a memory state of the LSTM at the time step t, $x_t$ represents a feature vector at the time step t in the input sequence, $h_t$ represents a hidden state of the LSTM at a time step t−1, and $c_{t-1}$ represents a memory state of the LSTM at the time step t−1; $W_{xi}$ represents an input weight matrix of the input gate that maps the $x_t$ to the $i_t$, $W_{hi}$ represents a hidden state weight matrix of the input gate that maps the $h_{t-1}$ to the it, and Wu, represents a memory state weight matrix of the input gate that maps the $c_{t-1}$ to the $i_t$; $W_{xf}$ represents an input weight matrix of the forgetting gate that maps the $x_t$ to the $f_t$, $W_{hf}$ represents a hidden state weight matrix of the forgetting gate that maps the $h_{t-1}$ to the $f_t$; and $W_{cf}$ represents a memory state weight matrix of the forgetting gate that maps the $c_{t-1}$ to the $f_t$; $W_{xo}$ represents an input weight matrix of the output gate that maps the $x_t$ to the $o_t$, $W_{ho}$ represents a hidden state weight matrix of the output gate that maps the $h_{t-1}$ to the $o_t$, and $W_{co}$ represents a memory state weight matrix of the forgetting gate that maps the $c_{t-1}$ to the $o_t$; $W_{xc}$ represents an input weight matrix for updating the memory state that maps the $x_t$ to the $c_t$, and $W_{hc}$ represents a hidden state weight matrix for updating the memory state that maps the $h_{t-1}$ to the $c_t$; and $b_i$ represents a bias value of the input gate, $b_f$ represents a bias value of the forgetting gate, $b_c$ represents a bias value for updating the memory state, and $b_o$ represents a bias value of the output gate.

A full connection layer is used to achieve:

$$\hat{y}_t=FC(h_t)$$

where FC( ) represents the full connection layer and $\hat{y}_t$ represents the predicted call time.

The loss function is the mean square error:

$$\text{Loss}=\frac{1}{N}\sum_{t=1}^{N}(\hat{y}_t-y_t)^2$$

where N represents the number of samples and $y_t$ represents the actual call time, that is, the revised call time.

S44: the call time of the controller on each aircraft is calculated.

By analyzing the conflict of route key points, the call content is predicted. By studying possible types of conflicts at the route key points, the system can predict communication needs between the controller and the pilot in advance, thereby preparing and adjust the call content more efficiently to process potential route conflicts.

S5: the call interval time in each time period is calculated according to the call time, and the call interval time is output as the call load prediction result of the controller in the area to be predicted.

According to the acquired required call time, the required call time in each time period is counted, then idle time is calculated, the idle time refers to the difference value between unit time and the required call time in the unit time, and the shorter the idle time, the higher the call load; at the same time, the ratio of the idle time to the number of calls is the call interval time, and the shorter the call interval time, the higher the call load of the controller. The call interval time is a main reference standard.

Specifically, a calculation formula of the idle time is as follows:

$$T-T_P=T_r$$

where T represents the unit time, $T_P$ represents a total of the required call time, and $T_r$ represents the idle time.

Specifically, a calculation formula of the call interval time is as follows:

$$\frac{T_r}{C}=T_i$$

where $T_i$ represents the call interval time and C represents a call frequency.

That is, the call interval time in each time period is equal to a difference between unit time and the total call time of the controller in each time period divided by call frequency.

Embodiment 3

Figure 2:
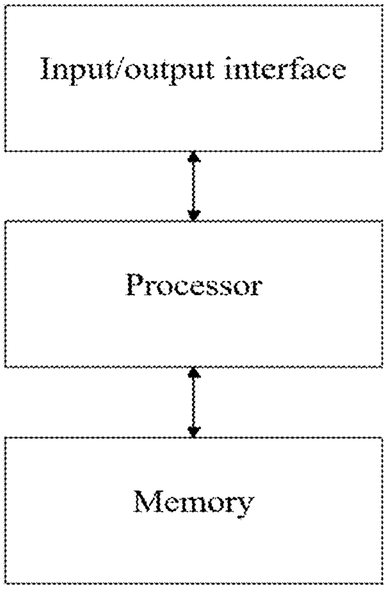
FIG. 2 illustrates a schematic structural diagram of a device for predicting the call load of the controller, using the method for predicting the call load of the controller according to embodiment 1, according to embodiment 3 of the disclosure.

As shown in FIG. 2, a device for predicting the call load of the controller includes at least one processor, a memory communicatively connected with the at least one processor, and at least one input/output interface communicatively connected with the at least one processor; the memory stores instructions executable by the at least one processor, and the instructions are executed by the at least one processor, so that the at least one processor can execute the method for predicting the call load of the controller according to the aforementioned embodiments. The input/output interface may include a display, a keyboard, a mouse, and a USB interface for inputting and outputting data.

It can be understood by those skilled in the art that all or part of the steps of the above method embodiments can be completed by a program to instruct related hardware, the above program can be stored in a non-transitory computer-readable storage medium, and when the program is executed, the steps including the above method embodiments are executed; the aforementioned storage medium includes various mediums that can store program codes, such as a mobile storage device, a read only memory (ROM), a magnetic disk or an optical disk.

When the above integrated units of the disclosure are realized in the form of software functional units and sold or used as independent products, they can also be stored in a non-transitory computer-readable storage medium. Based on this understanding, the technical solution essentially or the part contributing to the related art of the embodiments of the disclosure can be embodied in the form of as a software product. The computer software product is stored in a storage medium, and includes several instructions for making a computer device (a personal computer, a server, or a network device) execute all or part of the methods according to the embodiments of the disclosure. The aforementioned storage medium includes various mediums that can store program codes, such as a mobile storage device, an ROM, a magnetic disk or an optical disk.

The above description is merely preferred embodiments of the disclosure, and is not intended to limit the disclosure. Any modifications, equivalent substitutions and improvements made within the spirit and principle of the disclosure should be included in the protection scope of the disclosure.

What is claimed is:

1. A method for predicting a call load of a controller, comprising the following steps:

S1: acquiring air traffic control data of an area to be predicted; wherein the air traffic control data comprises real-time data, route data and historical data; the real-time data comprises ground-air call data, airspace restriction information, meteorological information and/or aircraft state information; the route data comprises route information and/or flight procedure information; the historical data comprises historical flight trajectory information, command schemes under different flight events and corresponding flight paths thereof; and the flight events comprise controller information, meteorological information, airspace restriction information, conflict types, time from a conflict, aircraft types and/or flow;

S2: analyzing flight path prediction information of each aircraft in the area to be predicted according to the air traffic control data; wherein the flight path prediction information comprises a flight path of each aircraft and time of arrival at each point in the flight path;

wherein the step S2 comprises:

acquiring a command intention of the controller and a flight intention of a pilot corresponding to each aircraft through the ground-air call data;

acquiring the route information and/or the flight procedure information, and acquiring an initial flight path of each aircraft according to the command intention of the controller and the flight intention of the pilot corresponding to each aircraft;

according to the initial flight path of each aircraft and the route data, calculating initial time point information of each aircraft arriving at each point in a corresponding initial flight path;

wherein a calculation formula of the initial time point information comprises:

wherein time required for an aircraft to fly in a straight line:

$$T_l = \frac{D_f}{V_{GS} \cdot \mathrm{COS}(\alpha) - W}$$

where $T_l$ represents time required for straight flight, $D_f$ represents a flight distance, $V_{GS}$ represents a ground speed of the aircraft, α represents an included angle between the aircraft and ground, and W represents an external wind speed; and wherein time required for the aircraft to turn:

$$T_t = \frac{\theta_t \cdot (R + D_p)}{V - W}$$

where $T_t$ represents time required for turning, $\theta_t$ represents a turning angle, R represents a turning radius, V represents a speed of the aircraft, W represents the external wind speed, and $D_p$ represents a distance of the aircraft deviated from a predetermined trajectory by wind;

according to the initial flight path and initial time point information of each aircraft in the area to be predicted, judging whether each aircraft has a conflict according to a safe interval of the area to be predicted;

in response to an aircraft with the conflict, matching one of the command schemes corresponding to one of the flight events with a highest similarity in the historical data, updating the initial flight path and the initial time point information of the aircraft with the conflict, and outputting the flight path prediction information of the aircraft with the conflict; and in response to an aircraft without the conflict, outputting the flight path prediction information of the aircraft without the conflict;

S3: acquiring a command scheme corresponding to each aircraft in the area to be predicted according to the flight path prediction information of each aircraft and the historical data, comprising:

S31: matching the historical flight trajectory information with the highest similarity to flight path information of each aircraft and the command scheme corresponding to each flight event in the historical data;

S32: updating the flight path information of each aircraft according to corresponding historical flight trajectory information to acquire accurate flight path information of each aircraft and one of the command schemes of a corresponding flight event;

wherein the step S32 is performed through a pre-constructed flight path prediction model based on long short-term memory (LSTM) for optimizing and updating; and the pre-constructed flight path prediction model comprises at least one encoder and at least one decoder;

wherein an operation expression of the at least one encoder is:

$$h_{enc,t}=\mathrm{LSTM}(X_{plan,t},X_{atc,t},X_{pilot,t},X_{history,t},h_{enc,t-1})$$

wherein an operation expression of the at least one decoder is:

$$h_{enc,t}=\mathrm{LSTM}(Y_{prev,t-1},h_{dec,t-1})$$

$$Y_{prev,t}=\mathrm{Dense}(h_{enc,t},h_{dec,t})$$

where $h_{enc,t}$ and $h_{dec,t}$ represent hidden states of the encoder and decoder at a time step t respectively, and $X_{plan,t}$ represents a flight plan information sequence at the time step t, and $X_{plan,t}$ is acquired from the route data; $X_{atc,t}$ represents a controller command information sequence at the time step t, and $X_{atc,t}$ is acquired from the air traffic control data; $X_{pilot,t}$ represents a pilot input information sequence at the time step t, and $X_{pilot,t}$ is acquired from the air traffic control data; $X_{history,t}$ represents a historical data sequence at the time step t; $h_{enc,t-1}$ represents a hidden state of the encoder at a time step t−1; $Y_{prev,t-1}$ represents a predicted flight path at the time step t−1; $h_{dec,t-1}$ represents a hidden state of the decoder at the time step t−1; $Y_{prev,t}$ represents a predicted flight path at the time step t; LSTM( ) represents LSTM unit processing, and Dense( ) represents full connection processing;

wherein the flight path prediction model adopts a mean square error as a loss function, and an expression thereof is:

$$\mathrm{Loss}=\frac{1}{N}\sum_{t=1}^{N}\|Y_{true,t}-Y_{prev,t}\|^2$$

wherein the loss function also comprises minimization through Adam optimizer, and an expression thereof is:

$$\text{Optimization: } \theta\leftarrow\theta-\eta\nabla_\theta \mathrm{Loss}$$

where Loss represents the loss function, $Y_{true,t}$ represents an actual flight path at the time step t, N represents a number of samples, $\nabla_\theta$ represents a gradient symbol, and represents derivative of θ, θ represents a model parameter, and η represents a learning rate; and S33: outputting the command scheme corresponding to each aircraft in the area to be predicted;

S4: calculating call time of the controller on each aircraft according to the command scheme, comprising:

S41: acquiring call content of each command scheme, and setting a call time initial value of each command scheme as general call time; wherein the general call time is average call time of each controller using each instruction in the historical data;

S42: matching with the historical data according to the corresponding real-time data and the call content to acquire the command scheme with the highest similarity and corresponding historical call time;

S43: according to the historical call time, revising the call time of each command scheme of the aircraft; wherein the revising is performed through a neural network model, and the neural network model is LSTM; a mean square error is selected as a loss function, and an adaptive moment estimation (Adam) optimizer is used for parameter optimization; and an input sequence is denoted as $X_f=\{x_1, x_2, \ldots, x_n\}$, where each of $x_1, x_2, \ldots, x_n$ is a feature vector containing information such as an aircraft state, controller instructions and traffic conditions;

wherein a calculation process of a hidden state and a memory state of the LSTM is as follows:

$$i_t=\sigma(W_{x1}x_t+W_{hi}h_{t-1}+W_{ci}c_{t-1}+b_i)$$

$$f_t=\sigma(W_{xf}x_t+W_{hf}h_{t-1}+W_{cf}c_{t-1}+b_f)$$

$$c_t=f_t\odot c_{t-1}+i_t\odot\tanh(W_{xc}x_t+W_{hc}h_{t-1}+b_c)$$

$$o_t=\sigma(W_{xo}x_t+W_{ho}h_{t-1}+W_{co}c_{t-1}+b_o)$$

$$h_t=o_t\odot\tanh(c_t)$$

where $i_t$, $f_t$, $o_f$ represent outputs of an input gate, a forgetting gate and an output gate, σ represents a sigmoid function, ⊙ represents multiplication at an element level, W represents a weight matrix, b represents a paranoid vector, $h_t$ represents the hidden state of the LSTM, and represents an internal representation of the neural network model for an input at the time step t, $c_t$ represents a memory state of the LSTM at the time step t, $x_t$ represents a feature vector at the time step t in the input sequence, $h_{t-1}$ represents a hidden state of the LSTM at the time step t−1, and $c_{t-1}$ represents a memory state of the LSTM at the time step t−1; $W_{x1}$ represents an input weight matrix of the input gate that maps the $x_t$ to the $i_t$, $W_{hi}$ represents a hidden state weight matrix of the input gate that maps the $h_{t-1}$ to the $i_t$, and $W_{ci}$ represents a memory state weight matrix of the input gate that maps the $c_{t-1}$ to the $i_t$; $W_{xf}$ represents an input weight matrix of the forgetting gate that maps the $x_t$ to the $f_4$, $W_{hf}$ represents a hidden state weight matrix of the forgetting gate that maps the $h_{t-1}$ to the $f_t$, and $W_{cf}$ represents a memory state weight matrix of the forgetting gate that maps the $c_{t-1}$ to the $f_t$; $W_{xo}$ represents an input weight matrix of the output gate that maps the $x_t$ to the $o_t$, $W_{ho}$ represents a hidden state weight matrix of the output gate that maps the $h_{t-1}$ to the $o_t$, and $W_{co}$ represents a memory state weight matrix of the forgetting gate that maps the $c_{t-1}$ to the $o_t$; $W_{xc}$ represents an input weight matrix for updating the memory state that maps the $x_t$ to the $c_t$, and $W_{hc}$ represents a hidden state weight matrix for updating the memory state that maps the $h_{t-1}$ to the $c_t$; and $b_i$ represents a bias value of the input gate, $b_f$ represents a bias value of the forgetting gate, $b_c$ represents a bias value for updating the memory state, and $b_o$ represents a bias value of the output gate;

wherein a processing expression for a full connection layer is as follows:

$$\hat{y}_t=FC(h_t)$$

where FC( ) represents the full connection layer and $\hat{y}_t$ represents a predicted call time;

wherein an expression of the loss function is as follows:

$$\text{Loss} = \frac{1}{N}\sum_{t=1}^{N}(\hat{y}_t - y_t)^2$$

where N represents the number of samples, and $y_t$ represents an actual call time, that is, a revised call time; and S44: calculating the call time of the controller on each aircraft; and S5: calculating call interval time in each time period according to the call time, and outputting the call interval time as a call load prediction result of the controller in the area to be predicted;

wherein the call interval time in each time period is equal to a difference between unit time and total call time of the controller in each time period divided by call frequency.

2. A device for predicting the call load of the controller, comprising at least one processor and a memory communicatively connected with the at least one processor; wherein the memory stores instructions executable by the at least one processor, and the instructions are executed by the at least one processor to enable the at least one processor to execute the method according to claim 1.

* * * * *